United States Patent [19]

Sommervold

[11] 4,236,894
[45] Dec. 2, 1980

[54] READOUT CIRCUIT IN AN AUTOMATIC CHEMICAL TESTING APPARATUS

[75] Inventor: David E. Sommervold, Houston, Tex.

[73] Assignee: Hycel, Inc., Houston, Tex.

[21] Appl. No.: 71,338

[22] Filed: Aug. 30, 1979

Related U.S. Application Data

[63] Continuation of Ser. No. 920,949, Jun. 30, 1978, abandoned.

[51] Int. Cl.$^3$ .................... G01N 21/75; G01N 33/48
[52] U.S. Cl. ............................ 23/230 R; 364/498; 364/497; 422/68; 422/67
[58] Field of Search ................ 23/230 R; 422/68, 67; 364/497, 498

[56] References Cited

U.S. PATENT DOCUMENTS

| | | | |
|---|---|---|---|
| 3,873,273 | 3/1975 | Moran et al. | 422/64 |
| 4,043,756 | 8/1977 | Sommervold | 23/230 R |
| 4,052,161 | 10/1977 | Atwood et al. | 422/64 X |
| 4,095,272 | 6/1978 | Janzen | 364/497 |

Primary Examiner—R. E. Serwin
Attorney, Agent, or Firm—Robert P. Cogan; Tim L. Burgess

[57] ABSTRACT

In an automatic chemical testing apparatus in which radiant energy readings are taken from a liquid sample of reacted contents comprising reagent and one or more aliquots, one per channel, of a sample fluid, a statistically large number of readings are taken on each sample. For example, in a readout cycle, 32 readings are taken on each channel for a sample. For an end point chemistry, calculation of an output value is based on the mean of a plurality of readings which are a subset of all readings. For a kinetic chemistry, the output reading is based on a slope of a curve defined by subsets of successive readings.

12 Claims, 6 Drawing Figures

READOUT CIRCUIT IN AN AUTOMATIC CHEMICAL TESTING APPARATUS

This is a continuation of application Ser. No. 920,949 filed on June 30, 1978, now abandoned.

BACKGROUND OF THE INVENTION

The present invention relates to automatic chemical testing apparatus, and more particularly to a method in apparatus for producing signals indicative of the concentration of substances in an analyzed sample.

A suitable environment contemplated for the present invention is disclosed in commonly assigned U.S. Pat. No. 3,728,079 issued Apr. 17, 1973 to John J. Moran, or U.S. Pat. No. 4,043,756 issued Aug. 23, 1977 to David E. Sommervold the disclosures of which are incorporated herein by reference. U.S. Pat. No. 3,622,279 issued Nov. 23, 1971 to John J. Moran, also commonly assigned and having its disclosure incorporated herein by reference, is particularly directed toward means for providing readout signals in response to reacted contents in reaction containers.

In the type of apparatus under consideration, aliquots of a sample generally comprising human serum are each dispensed into a reaction container and reagents are added thereto. After sufficient incubation, a reading is made of the contents of the reaction container to provide a signal indicative of a particular parameter. In the preferred form, the reading is made spectrophotometrically, and an analog signal indicative of optical density is provided. In order to determine concentration of the particular substance of which analysis is being made of the particular aliquot, the optical density reading must be translated into a reading indicative of concentration units of a substance.

A means of providing an output indicative of concentration units is by the use of the electrical circuitry and printout means. The circuitry utilizes known techniques to process the analog readout signal indicative of optical density into an output signal for provision to printing or display means indicative of concentration units. The circuitry employs a linear curve relating optical density to concentration of the substance which has been empirically determined. (Curve fitting techniques are well-known in the art, and do not form a part of the present invention. Therefore, curve fitting techniques and circuitry are not discussed in great detail herein.)

Normally, a single spectrophotometric reading is made in the case of an end point chemistry. This reading is related to its position on the aforementioned linear curve. In the case of a kinetic reaction, one which is characterized by the difference in optical densities at first and second reading times rather than by a single density at a single reading time, one reading is taken at each of the first and second times to define a slope of optical density versus time. While such techniques have provided reliable readings, they rely on a limited amount of measurement. Only one reading is made for one optical density point. In some embodiments, a few readings of one point may be made for assuring reliability. However, in none of these embodiments are the readings taken statistically large. In the present description, statistically large comprehends a number of readings that is large with respect to prior art embodiments. In another form of prior art apparatus, disclosed in U.S. Pat. No. 4,052,161 issued Oct. 4, 1977 to Atwood et al, a measurement period is provided which is extended with respect to other prior art measurement periods as is also contemplated by the present invention. However, a continuous optical absorbence reading is provided which varies to vary the input to a voltage to frequency converter having an output connected to counters. In that prior art embodiment, an optical absorbence curve from which concentration units in the sample may be determined is generated. However, a plurality of individual optical density values are not generated.

SUMMARY OF THE INVENTION

It is therefore an object of the present invention to provide in an automatic chemical testing apparatus means for generating a statistically large number of output readings from which concentration values may be generated.

It is a further object of the present invention to provide means of the type described for generating output signals for both end point and kinetic chemistries.

It is also an object of the present invention to provide an apparatus of the type described in which data points are generated representative of optical density versus time for a sample under analysis during a measurement period.

It is an additional object of the present invention to provide apparatus of the type described for relating the optical density versus time curve of a sample to concentration units of the substance being tested for in the sample.

Briefly stated, in accordance with the present invention, in an automatic chemical testing apparatus, a measurement period is provided for optical density analysis of a liquid sample. A statistically large number of readings are taken, such as 32 readings in an extended readout period. For an end point chemistry, a mean value of the readings may be generated to generate a value for relation to an optical density versus concentration units curve. For a kinetic chemistry, a slope of the optical density versus time curve may be generated based on analysis of the optical density data points measured continuously and periodically during the measurement period.

BRIEF DESCRIPTION OF THE DRAWINGS

The means by which the foregoing objects and features of invention are achieved are pointed out with particularity with the claims forming the concluding portion of the specification. The invention, both to its organization and manner of operation, may be further understood by reference to the following description taken in connection with the following drawings.

Of the drawings.

DESCRIPTION OF THE PREFERRED EMBODIMENT

Figure 1:
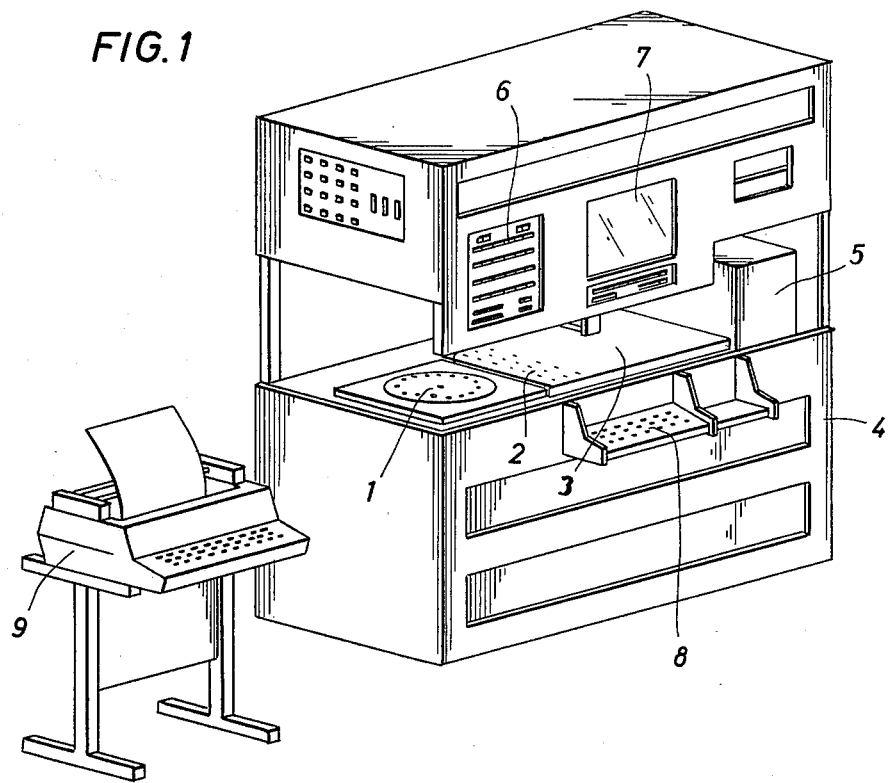
FIG. 1 is an illustration of an automatic chemical testing apparatus incorporating the present invention.

FIG. 1 is an illustration of an automatic chemical testing apparatus incorporating the present invention. While the present invention may find application in many forms of chemical analyzers, the preferred environment is the analyzer described in the above-cited patents to Moran. Reference should be had thereto for a further description of the chemical testing apparatus of FIG. 1. Briefly stated, samples are successively obtained from a sample source 1 and delivered to reaction containers in a reaction loop 2 having incubation and reagent dispensing stations 3. Reagents are supplied thereto from reagent supply means 4. At a further end of the reaction loop 2, aspiration and analysis means 5 withdraw reacted contents from reaction containers in the conveyor 2 and provide photometric readouts indicative of optical density of each sample. A test selection panel 6 is provided for selecting which tests are to be performed on each sample and consequently for controlling which reagents are dispensed into each reaction container if any in the conveyor 2. In the present embodiment, display means 7, keyboard means 8, and printout means 9 are provided. The display means 7 and printout means 9 of the present embodiment replace the chart recorder of the embodiment of the above-cited patents to Moran. The readout means 5 provide a plurality of readout signals, each indicative of optical density of a reacted aliquot in each channel for one sample during a machine cycle. Calibration serum sets are used to relate concentration values indicated by the level of analog signals coming from the readout block 5 to known values predetermined for each blank and reference sample. This is done separately for each channel of the analyzer in FIG. 1, there are 17 chemistry channels. A different analog output indicative of a particular substance in a sample is provided for each channel.

Figure 2:
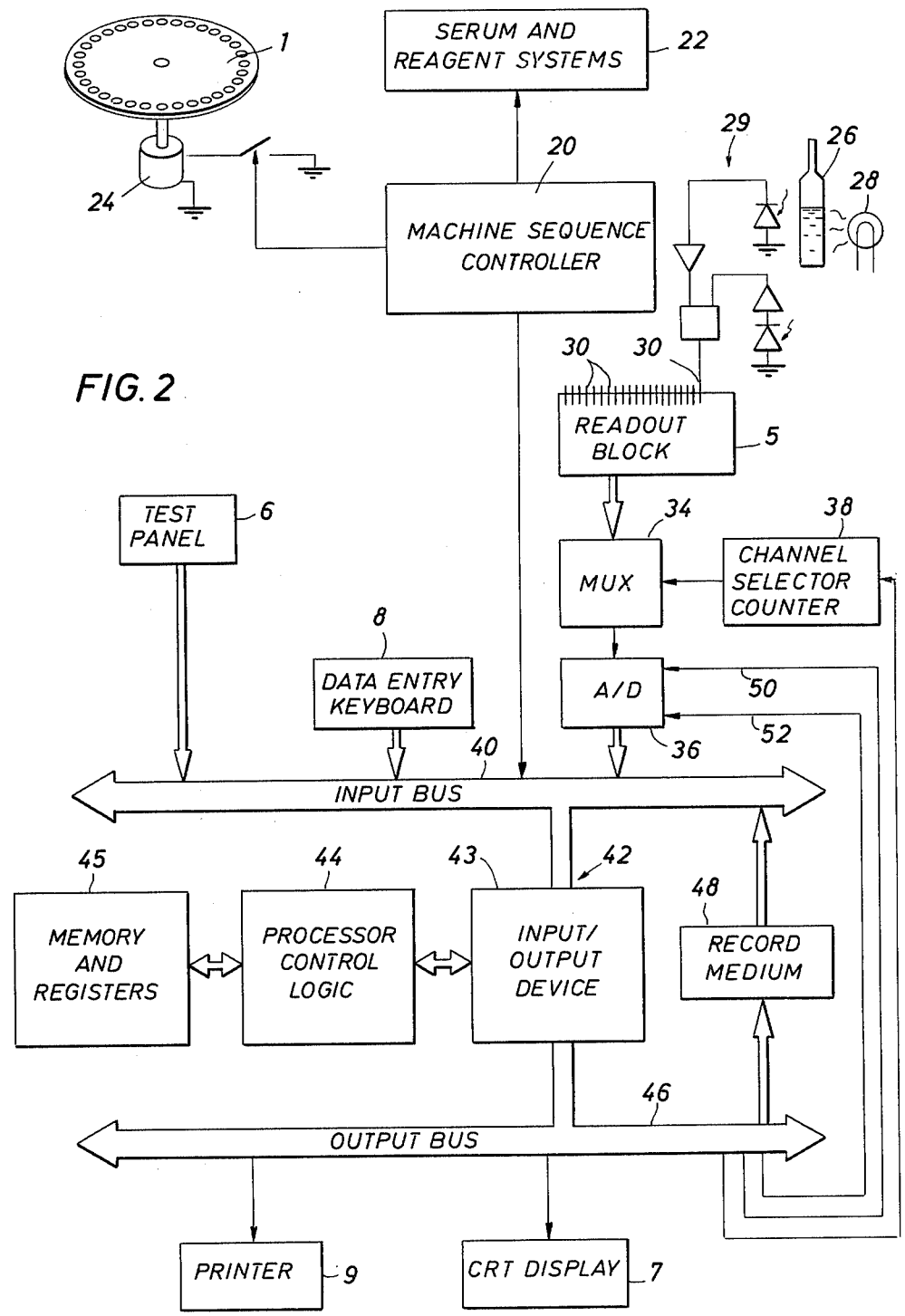
FIG. 2 is a block diagrammatic representation of the present invention.

FIG. 2 is a block diagrammatic representation of an apparatus incorporating the improved calibration system of the present invention. System elements briefly referred to here which perform the functions of prior art analyzers are more fully described in the above-cited patents to Moran.

Referring to FIG. 2, machine functions are controlled and coordinated by a machine sequence controller 20 which provides timing and enabling signals to various components. The machine sequence controller 20 may be made in a hard wired form as disclosed in the above-cited patents to Moran, or may include mini-computer or microprocessor circuitry. The machine sequences controller 20 provides timing signals to serum and reagent systems 22. The serum and reagent systems 22 include the reagent dispensing station 3, reagent supply means 4, and the conveyor carrying the reaction containers. The machine sequence controller 20 further provides signals for energizing a motor 24 for periodically indexing the sample source 1. The test selection panel 6 is also connected to the machine sequence controller 20 which translates test selections reflected by the pressing of test selection buttons in the control means 6 into command signals at appropriate times for dispensing reagents into preselected reaction containers. In the preferred embodiment the machine sequence controller 20 comprises dedicated portions of the data translating means 42 described below.

As described in the patents to Moran, readout cuvettes 26 are provided in the analysis means 5 (FIG. 1). Radiant energy from a source 28 is directed through reacted contents in the readout cuvette 26 to provide a resulting amount of light at a particular wavelength to a sensor circuit 29 connected to a set of terminals 30. For simplicity of the drawing, a number of sets of terminals 30 are illustrated, each for connection to a sensor circuit for making a similar form of measurment. The wavelength to which each sensor circuit 29 is made sensitive, for example, as by appropriate filtering, is selected in accordance with the particular chemistry being performed. The amount of light at the wavelength is a Beer's law function of the optical density of the reacted contents in the readout cuvettes 26. Consequently, the analog signal appearing at the terminal 30 is indicative of the concentration of the substance being tested for in particular channel corresponding to the particular readout cuvette 26. The sensor circuit 29 may comprise a well-known log ratio circuit such as is disclosed in commonly assigned U.S. Pat. No. 4,061,469 issued Dec. 6, 1977 to Charles R. DuBose, the disclosure of which is incorporated herein by reference.

The analog outputs are all supplied to a multiplexer 34 which supplies analog outputs one at a time to an analog-to-digital converter 36. The outputs of the analog to digital converter 36 are optical density signals each indicative of optical density value at a particular time of reacted aliquot in the cuvette 26, and may also be called optical density values or readout values. The multiplexer 34 may include a decoder connected to a channel selector counter pass the signal corresponding to a channel indicated by the output of the channel selector counter 38. While this is a preferred form, other means may be used for providing digital signals. Some other form of transducer for providing digital rather than analog output could be used and polling or interrupt techniques can be used for translating the results to a point corresponding to the output of the analog digital converter 36. The present embodiment is illustrated since it is a very effective and simple form of obtaining the data. The invention is directed toward utilizing radiant energy measurement in an automatic chemical testing apparatus. Optical density reading is equivalent in this context to newer, less widely utilized forms of measurement such as nephelometry or measurement of fluorescence.

Outputs are provided to an input data bus 40 to data translating means 42. The data translating means 42 may, for example, comprise such commercially available apparatus as the Alpha 16 Computer or LSI-II minicomputers manufactured by Computer Automation, Inc., Irvine, Cal. Depending on the amount of data to be handled, microprocessors such as the Motorola M6800 or Texas Instruments 8080 could also be utilized. The data translating means 42 comprises a standard input/output circuit 43, processor and control logic circuit 44, and memory and register banks 45, all interconnected for processing data at appropriate times as described below. The input/output device 43 is connected to an output bus 46 which provides output data to the cathode ray tube display 7 and printer 9 (FIG. 1) as well as an input to the channel selector counter 38 and a record medium unit 48. The record medium 48 may also be used to provide data to the input bus 40. Commonly utilized record media include magnetic tape or "floppy disks". The machine sequence controller 20, data entry keyboard 8, and test selection panel 6 are all connected to the input bus 40 for conventional synchronization and coordination of data handling functions.

In accordance with the present invention, further inputs to the analog to digital converter 36 are provided from the output bus 46. A line 50 provides periodic pulses to enable the analog to digital converter 36 to sample and hold instantaneous values coupled thereto from the readout block 5. The analog to digital converter 36 may provide parallel or serial output. A line 52 enables the analog to digital converter 36 to transmit data to the input/output device 43.

Figure 3:
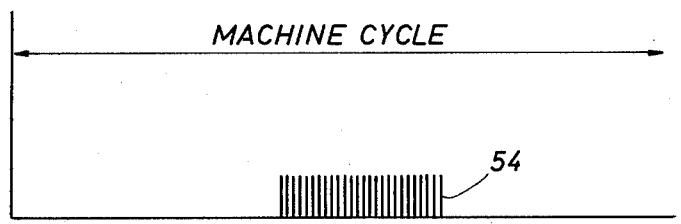
FIG. 3 is a timing chart illustrating the sample and whole function to provide inputs to the analog two digital converter of FIG. 2.

FIG. 3 is a chart illustrative of an operation cycle. An operation cycle includes such functions as presenting a next reaction container in the reaction loop 2 to the analysis means 5, withdrawing liquid sample into the analysis means 5 and performing a readout under the supervision of the machine sequence controller 20. The envelope indicated in dotted form in FIG. 3 indicates a measurement period established by the means connected to the analog to digital converter 36. During a measurement period, liquid in readout cuvette 26 is analyzed. The analysis comprises taking a statistically large number of spectrophotometric optical density readings. These readings will be used as described below to generate a composite optical density signal. This is accomplished by providing in response to a preset command, the sample and hold signals 54 illustrated in FIG. 3. In a preferred embodiment, thirty-two such pulses are provided during a sixteen second of measurement period. In response to each pulse, the analog to digital converter 36 is operated to sample an instantaneous reading for one sample from the readout block 5. The waveform illustrated in FIG. 3 is provided for each sample. The channel selector counter 38 counts through each channel so that signals 54 are provided to sample optical density outputs for each channel and establish a measurement period therefor. A measurement period is a period of time greatly prolonged with respect to the time required to take a reading or set readings for an end point chemistry and which is long enough to resolve a meaningful change in a kinetic chemistry. In the present embodiment, it is sixteen seconds. The line 52 delivers pulses synchronized to the pulses 54 to gate the optical density signals to the input bus 40, which may include serial to parallel conversion means.

Figure 4:
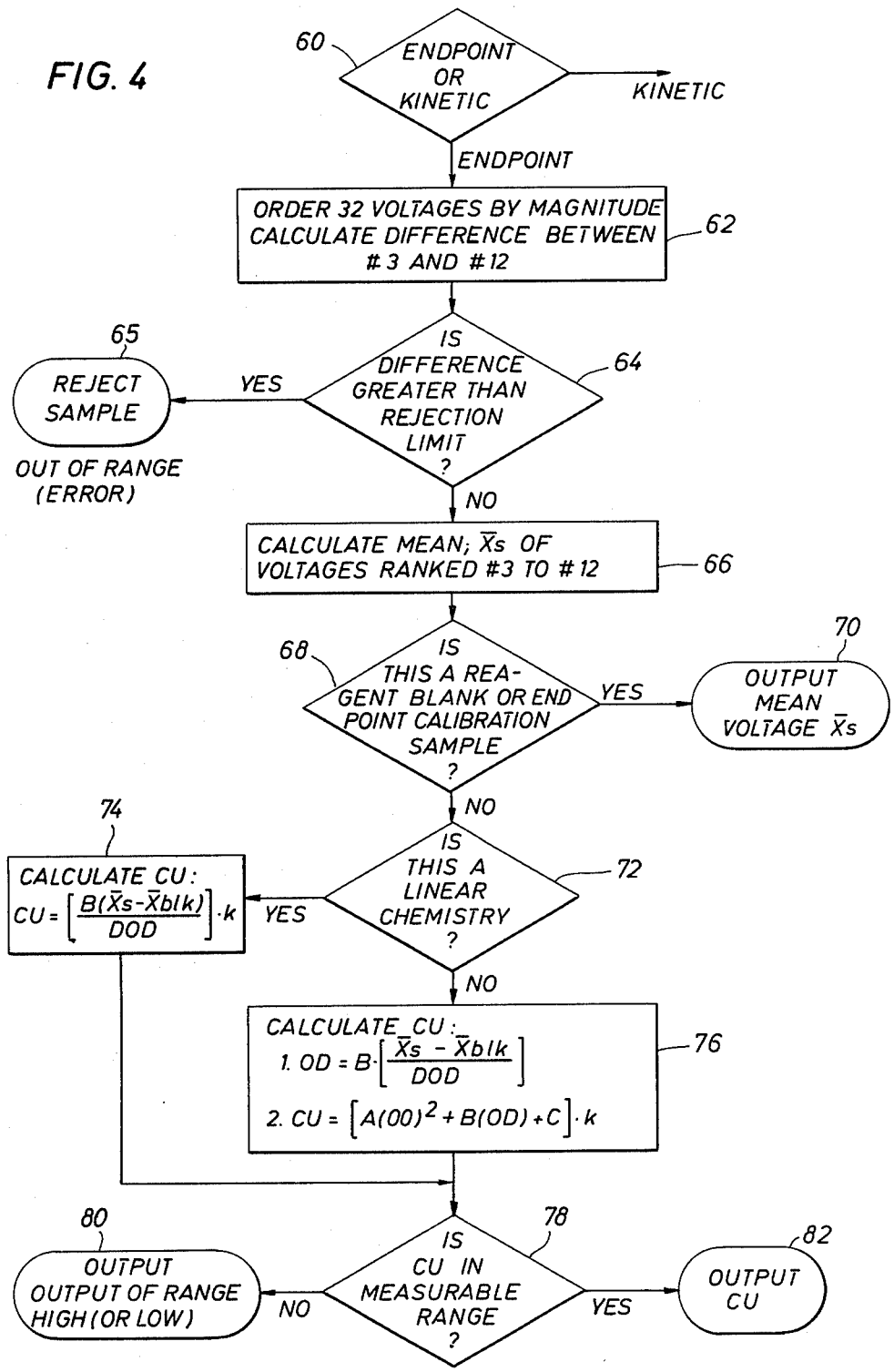
FIG. 4 is a flowchart illustrating operation of the present invention to process optical density data for an end point chemistry.
Figure 5:
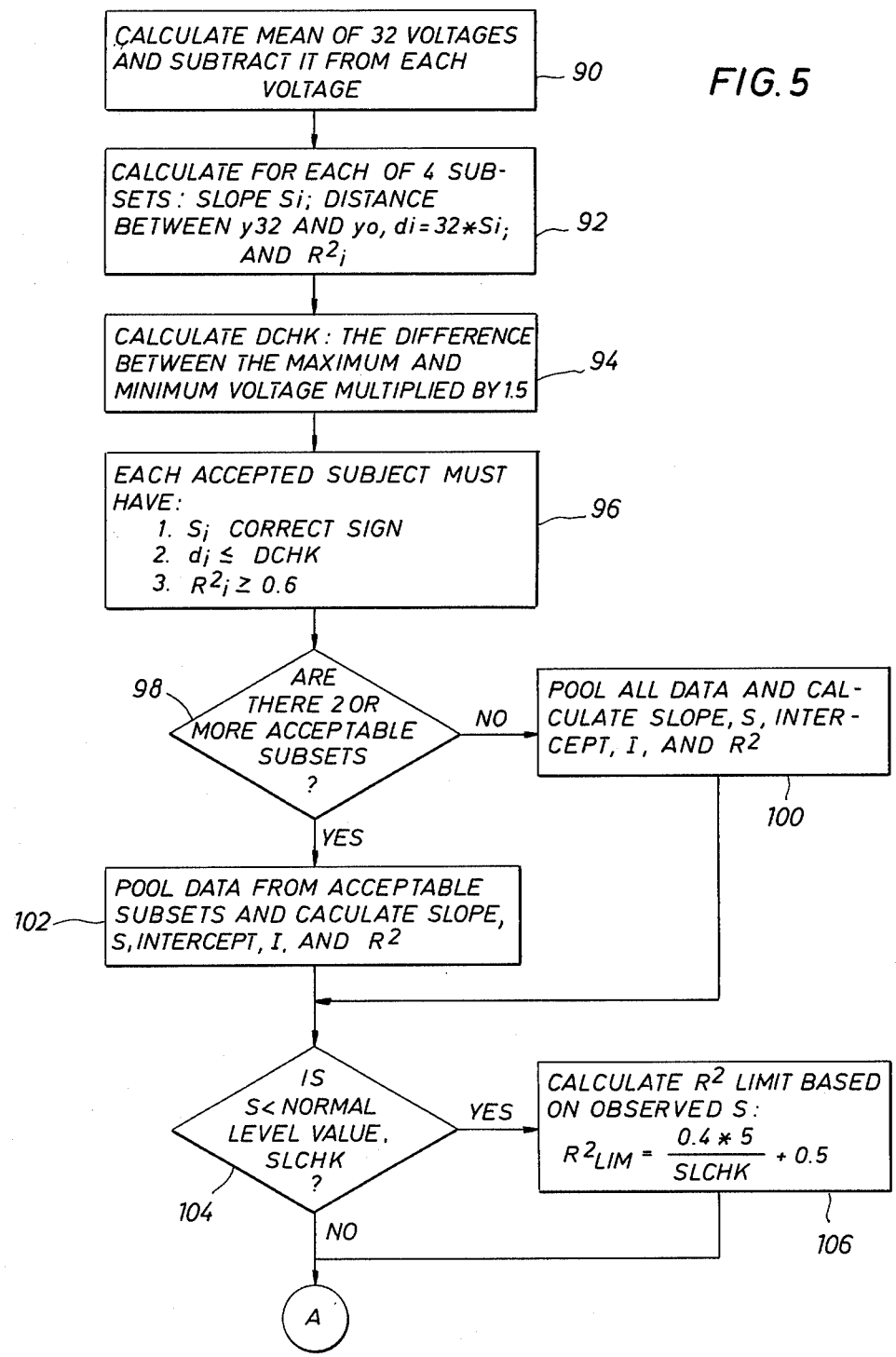
FIGS. 5 and 6 taken together are a flowchart illustrating the generation of output values based on readings taken for a kinetic chemistry.
Figure 6:
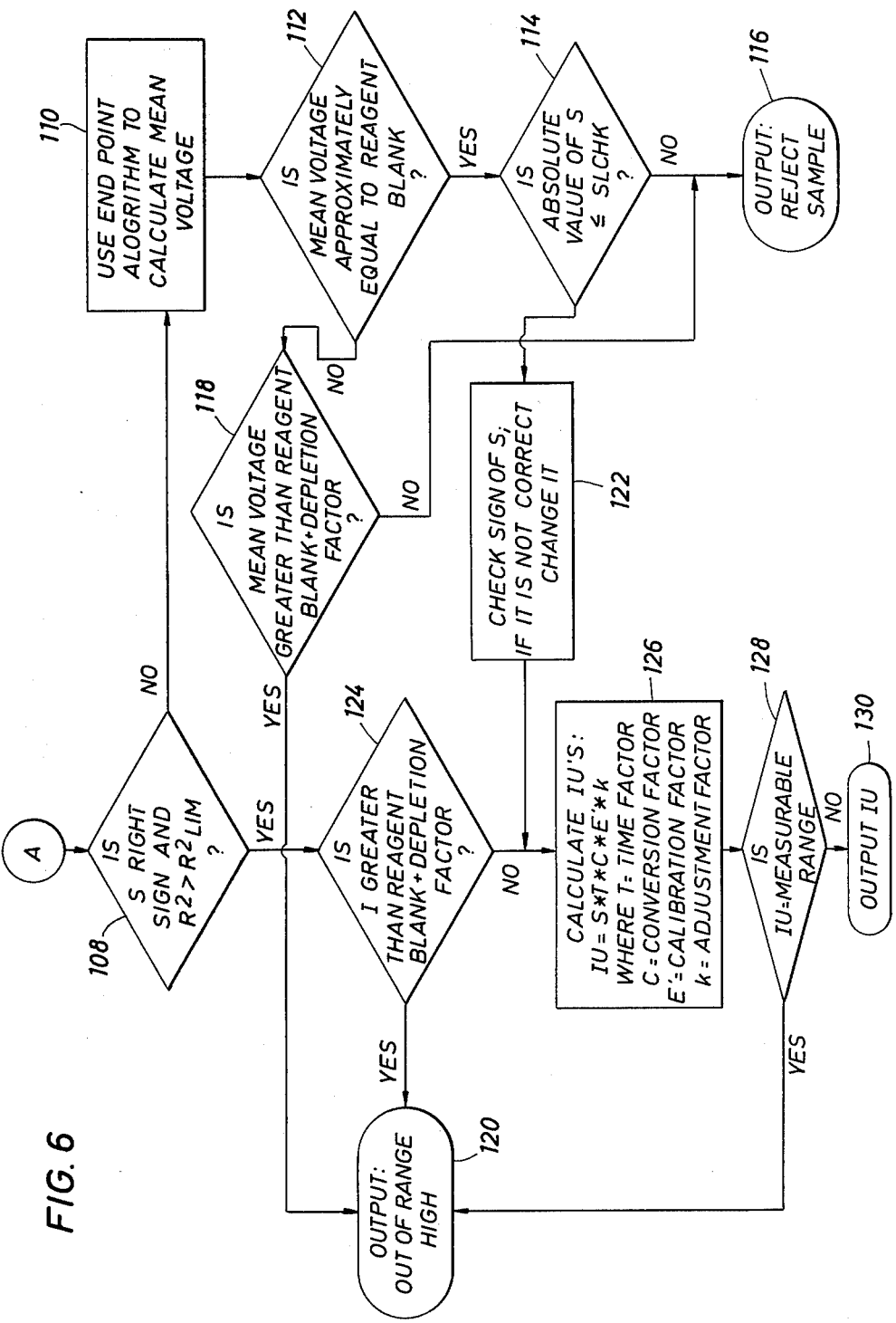

Further in accordance with the present invention, these signals are related to concentration units. The processing of each of these samples is illustrated in FIGS. 4–6 which are flowcharts respectively indicative of the interaction of the subject apparatus to provide outputs indicative of concentration units based on optical density readings. Well-known functions are utilized to produce concentration unit readings based on optical density readings. However, composite optical density values generated from several values of sensor signals each indicative of optical density as described below is generated for use in conjunction with these well-known functions rather than the prior art embodiment of simply using directly read sensor valves as the apparatus input representing the optical density reading to be processed.

The actual coding of a computer program to interconnect the computer in accordance with the present invention, is a direct function of the flowchart. Those skilled in the art may translate the flowcharts of FIGS. 4–6 into computer programs without experimentation by well-known techniques to provide apparatus in accordance with the present invention. For example, translation of a flowchart into a computer program without undue experimentation is illustrated in John G. Wester & William D. Simpson, Software Design for Microprocessors. (Texas Instruments, Dallas, Texas, 1976). The provision of a flowchart rather than a particular program listing will enable those skilled in the art to select their own computer. Program steps are translated into particular program language, for example, through the use of the manual associated with a particular computer. If one desires to implement the present invention on an Alpha-16 computer, reference may be had to Alpha 16 & Naked Mini R 16 Computer Reference Manual (Computer Automation, Inc., Newport Beach, Cal. 1971). For programming a Motorola M-6800 Microprocessor, reference may be had to M-6800 Microprocessor Programming Manual (Motorola, Inc., 1975). Many different computers may be substituted for the computing means 42 of FIG. 2 to provide circuitry operating in accordance with the present invention.

Operation begins in FIG. 4 at block 60 in which the processor control logic provides a code indicative of the chemistry being performed. It is predetermined which chemistries are kinetic and which are end point chemistries. Therefore, each chemistry will uniquely correspond to a code for its type. For a kinetic chemistry operations proceeds to FIG. 5. For an end point chemistry, operation proceeds to block 62. At block 62, all the results for that channel are accessed from the memory and register units 45 and ordered by magnitude. The difference between reading number 3 and reading number 12 is calculated. Differences between other readings may be taken. However, it is desirable to compare two readings spaced in time during the earlier half of the measurement period. At block 64, it is determined whether this difference exceeds a preselected limit, and if so, at block 65 an error indication is provided so that error may be printed out printer 9. If not, a mean value, X of a plurality of voltages taken is provided. In accordance with the present invention, it is desired to calculate a statistically large number of voltages. However, in accordance with the present invention, it is not necessary to take the mean of all voltages to arrive at a statistically large number. Therefore, in the preferred embodiment, the third through twelfth largest voltages are calculated. Statistical oddities are in this manner eliminated. At block 68 it is determined what mode the analyzer is operating in. Modes are further described in the above-cited patent to Sommervoid. If the test is a blank sample, the analysis is finished and the mean value X is provided an an output for storing in the memory and register unit 45 for a calibration operation. If not, block 68 leads to block 72.

At block 72, it is determined whether the chemistry being performed is linear of nonlinear. Linearity or nonlinearity is a characteristic associated with each chemistry, and codes to indicate the status are predetermined for each chemistry. For a linear chemistry, operation proceeds to block 74 at which concentration units are calculated in accordance with the well-known functions. The calculation per se is not part of the present invention.

$$CU = \frac{(B)(XS - X\text{blk})k}{DOD}$$

Where B equals a predetermined coefficient for the chemistry generated at calibration time.

$$B = \frac{DOD \times \text{Cal Val}}{X\text{cal} - X\text{blk}}$$

X is the mean generated at block 66, where X cal is a calibration valve provided at block 70 and calval is a known valve for a calibration sample.

X blk is a blank value as provided at block 70

K equals a adjustment factor constant derived from control valves utilized during calibration.

DOD is an opticaldensity to volts constant based on path length measurements.

For a nonlinear chemistry, operation proceeds to block 76, which also utilizes the traditional equations of:

$$OD' = \frac{B(XS - x\text{blk})}{DOD}$$

and $$(A(OD_2)^2 + B(OD) + C)k$$

$CU = A$ where A, B and C are preselected coefficients for that particular chemistry. As is well known in the art, each chemistry has its own curve function.

$$B' = \frac{DOD \times \text{Cal } OD}{X\text{cal} - X\text{blk}}$$

where cal OD is a known valve for a calibration sample.

Both blocks 74 and 76 proceed to block 78 at which the calculated concentration units is compared to present limit table indicative of permissible values for the particular chemistry. If the comparison indicates an out of range measurement, blocks 80 follows at which an out of range, high or low, indication is accessed from the memory and register unit 45 for transmission to the printer 9. If the comparison indicates a determination within the range, then block 82 proceeds at which the output is provided.

If the chemistry is kinetic, block 60 proceeds to block 90 in FIG. 5, which taken together with FIG. 6 is a flowchart for processing values for a kinetic chemistry. All 32 voltages corresponding to the subject channel are accessed from the memory and register unit 45 and the mean thereof is calculated, and the mean is subtracted from each voltage value. A composite optical density signal is provided in that many optical density data points are utilized for generation of optical density information to be converted into concentration units rather than utilizing substantially raw optical density information from the analysis means 5. At block 92, differences between voltages and means for each of four subsets thereof are utilized to compute slope. The difference between the first reading and the last reading, respectively called y32 and y1, (assuming 3a readings) is taken and $R^2i$ is also calculated, where R is a well-known, calculated "goodness of fit" number and i is the subscript of the y value. At block 94, a value is calculated called DCHK. DCHK equals the difference between the highest and lowest voltages times 1.5. At block 96, each of the four subsets is analyzed for a slope of the correct sign. For each chemistry, it is predetermined whether optical density will be monotonically increasing or decreasing, so that the sign will be predetermined for each chemistry. Also, as a check on curvature, the value di, which is equal to 32 times Si, is compared whether it is less than or equal to DCHK. Si is slope from a preceding point, to the y value whose subscript is i. $R^2i$ is determined to see whether it is greater than or equal to 0.6.

At block 98 it is determined whether or not there are two or more acceptable subsets. If not, at block 100, all 32 values are utilized to calculate Slope S, Intercept I, and $R^2$. If so, at block 102 data from acceptable subsets is utilized to calculate the same values. Both blocks 100 and 102 lead to block 104 which is a Slope Check indicated SLCHK in the drawing. If the value of slope is greater than a preselected normal value block 106 is proceeded to at which an $R^2$ limit is calculated based on observed slope. Block 106 and the alternative path from block 104 lead to junction point A which is also marked in FIG. 6 to indicate the continuation of operation. FIG. 6 proceeds from the junction point A to the block 108 at which further limit checks are made. If further limit checks may include whether $R^2$ is out of limits and S is the right sign, if not block 110 is proceeded to. Block 110 calls a subroutine consisting of blocks 66 through 70 of FIG. 4. At block 112, the mean value thus obtained is compared to a value to be expected from a reagent blank. It is is approximately equal, then the absolute value of slope is compared to the SLCHK value. If it is not less than or equal to that value, an out of range error is produced at block 116. If the mean generated at block 110 is not approximately equal to a blank voltage, at block 118 it is compared to a reagent blank plus depletion factor and if the voltage is greater, at block 120 a high error is indicated. If it is not, at block 116 an invalid sample is indicated. If at block 108 the slope is within limits, then the value of I is compared to reagent blank plus depletion factor. If it is greater, then block 122 is proceeded to. Both blocks 122 and 124 provide values indicative of values which may be utilized. At block 126, the standard conversion to calculate concentration units in international units is utilized.

$IU = (S)(T)(C)(E')(k)$

Where T = time factor, C = conversion factor, E' = a calibration factor, and K = an adjustment factor.

Again, the calculation per se is not part of the present invention. At block 128 the value is compared to a preselected limit table and if greater than a measurable range block 122 is proceeded to so that an error will be reported to the print unit 9. If not, the value is representative of good data and an output is provided at block 130.

What is thus provided is an automatic chemical testing system in which a statistically large number of readings are taken to in effect generate an optical density versus time curve for a sample liquid under test. Further, these data points may be used to provide an improved calculation of concentration units based on the improved method of generating a composite optical density value to be used for conversion to concentration units. Resolution and sensitivity are improved, providing for greater flexibility in selection of chemistries. The foregoing specification should enable those skilled in the art to make many modifications of the embodiment disclosed herein to provide spectrophotometric measurement in an automatic chemical testing apparatus in accordance with the present invention.

What is claimed as new and desired to be secured by Letters Patent of the United States is:

1. An automatic chemical testing apparatus having means for containing a mixture of a sample upon which a test is being performed and at least one reagent, said mixture undergoing a chemical reaction the results of which are related to the test being performed, said apparatus comprising:

means for transmitting energy through said mixture;

detecting means responsive to the energy transmitted through said mixture for providing an analog voltage related to said chemical reaction;

converter means responsive to said voltage and a control signal for providing a digital signal related to the valve of said analog voltage at the time said control signal is applied; and control means for providing control signals to control said converter means during a defined measurement period to provide a digital signal at the beginning of said measurement period, a digital signal at the end of said measurement period and digital signals at a plurality of independent times between the beginning and end of said measurement period, said control means responding to said provided digital signals by storing a value related to the value of each digital signal and determining at least one value based on subsets of said stored values, said control means providing an output signal manifesting the results of the test being performed in response to said determined value.

2. The invention according to claim 1 wherein said detecting means detects the optical density of said mixture and said control means converts said optical density values into concentration units as the results provided.

3. The invention according to claim 1 wherein said control means determines the average value for a subset of said stored values, said subset excluding at least the highest and lowest stored values.

4. The invention according to claim 1 wherein said control means arranges said stored values in order and determines the average value for a subset of said ordered values, said subset including less than one-half of said ordered values between said highest and lowest, exclusive, ordered values.

5. The invention according to claim 4 wherein said control means determines the difference between the highest and lowest values of said subset and manifests that the results cannot be measured if said difference exceeds a predetermined amount.

6. The invention according to claim 1 wherein said control means determines the slope value for a plurality of subsets of said stored values, and checks each determined slope against a preselected limit, said output signal being provided in response to said determined slope values.

7. A method of operating a chemical analyzer in which a sample to be tested and reagents are mixed, and a voltage is obtained based on the spectral characteristics of said mixture, said method comprising the steps of:

converting said voltage to a digital signal at the beginning, the end and at a plurality of independent times between the beginning and end of a measurement period;

storing values related to said digital signals;

determining a value from a subset of said stored values; and determining the results of said test in response to said determined value.

8. The method according to claim 7 wherein said step of converting said voltage occurs at equispaced time intervals.

9. The method according to claim 7 wherein said step of determining the results includes the steps of determining a composite optical density value from at least one subset of said stored values and calculating concentration units from said composite optical density.

10. The method according to claim 7 wherein said step of determining said value further includes the step of determining the slope of a plurality of subsets of said stored values, said determined results further being responsive to said determined slopes.

11. The method according to claim 7 wherein said step of determining the value includes the steps of ordering said stored values, selecting a subset of said ordered values, which subset excludes at least the largest and smallest ordered values, and determining the average value of the values only in said selected subset.

12. The method according to claim 7:

wherein said chemical analyzer is capable of being operated to perform end point chemistry tests on said mixture or kinetic chemistry tests on said mixture;

wherein, in the event said analyzer is performing an end point chemistry test, said step of determining the value includes the steps of ordering said stored values, selecting a subset of said ordered values, which subset excludes at least the largest and smallest ordered values, and determining the average value of the values only in said selected subset; and wherein, in the event said analyzer is performing a kinetic chemistry test, said step of determining said value further includes the step of determining the slope of a plurality of subsets of said stored values, said determined results further being responsive to said determined slopes.

* * * * *